United States Patent [19]

Shin et al.

[11] Patent Number: 4,683,721
[45] Date of Patent: Aug. 4, 1987

[54] TWIN-CRANK TYPE HEAT ENGINE

[75] Inventors: Myung Chul Shin, Seoul; Chil Sung Kim, Incheon; Young Hoon Chung; Kwang Koo Jee, both of Seoul, all of Rep. of Korea

[73] Assignee: Korea Advanced Institute of Science & Technology, Seoul, Rep. of Korea

[21] Appl. No.: 855,018

[22] Filed: Apr. 22, 1986

[30] Foreign Application Priority Data

Sep. 12, 1985 [KR] Rep. of Korea ............... 1985-6671

[51] Int. Cl.⁴ ............................................. F01B 29/10
[52] U.S. Cl. ........................................ 60/527; 60/529
[58] Field of Search ................................. 60/527, 529

[56] References Cited

U.S. PATENT DOCUMENTS 4,086,769  5/1978  Smith .................................. 60/527
4,393,654  7/1983  Pelly ................................... 60/527

Primary Examiner—Stephen F. Husar
Attorney, Agent, or Firm—Townsend & Townsend

[57] ABSTRACT

A heat engine is provided with twin crankshafts and coil shaped power elements mounted between each of two crankshafts. Each power element moves upward and downward, parallel with the surface of a tank of hot water, in which the engine is partially submersed, so that every part of the power element is allowed to remain submersed in the hot water for the same time interval so as to achieve maximum rotating power.

1 Claim, 5 Drawing Figures (a)

(b)

TWIN-CRANK TYPE HEAT ENGINE

BACKGROUND OF THE INVENTION

The present invention relates to a twin-crank type heat engine comprising two symmetrically arranged crank shafts with power elements made of a shape memory metal having the most effective mechanical properties, in order to generate mechanical energy by optimum rotation of said crank shafts.

As examples of a conventional engine using a shape memory metal to convert thermal energy into mechanical energy, generally, offset type, swash plate type, or belt type engines have been previously well-known. Due to the contradiction of mechanism, however, these engines have not been in use for practical purposes.

In case of the offset-crank type engine, a coil-shaped power element is gradually submerged from the front part thereof into hot water. Due to such gradual submergence of the power element, a thermal tensile force generated by the first submerged part of coil is consumed to lengthen the following part, thereby causing the amount of power loss to increase. Moreover, less than twenty percent of the tensile force is effective to generate the rotating power.

In the swash-plate type engine, maximum efficiency can be obtained at the slope angle of 45°. Even in this condition, however, only seventy percent (70%) of the thermal tensile force (Sin 45°=0.7070) is effective, thereby causing the power loss to be more than thirty percent (30%).

In the belt type engine, the power element is formed into a belt associated with a pulley. The pulley is driven by the friction created by the thermal tensile force. Accordingly, the obtained effective power is limited by the value of the friction coefficient. Moreover, direct contact between the power element and the pulley causes an adverse effect by reducing the service life of belt. In addition, a heat exchange between the power element and the pulley is insufficiently carried out at contact regions while heating and cooling are applied.

SUMMARY OF THE INVENTION

To eliminate the above-mentioned disadvantages, the present invention provides a twin-crank type heat engine comprising coil-shaped power elements mounted between two crank shafts, each power element moving upwards and downwards in parallel with the surface of hot water so that every part of said power element can stay in the hot water for the same time interval to exert a maximum thermal tensile force; thus, achieving maximum rotating power.

The present invention will be apparent from the following detailed description and drawings.

DETAILED DESCRIPTION OF THE PREFERED EMBODIMENT

Figure 1:
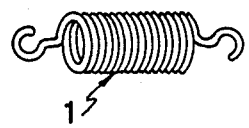
FIG. 1 is a perspective view of the power element
FIG. 1-a is a view of coiled power element
FIG. 1-b is a view of lengthened power element at atmospheric temperature.
Figure 1:
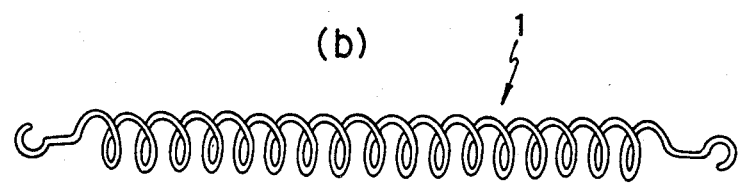
Figure 2:
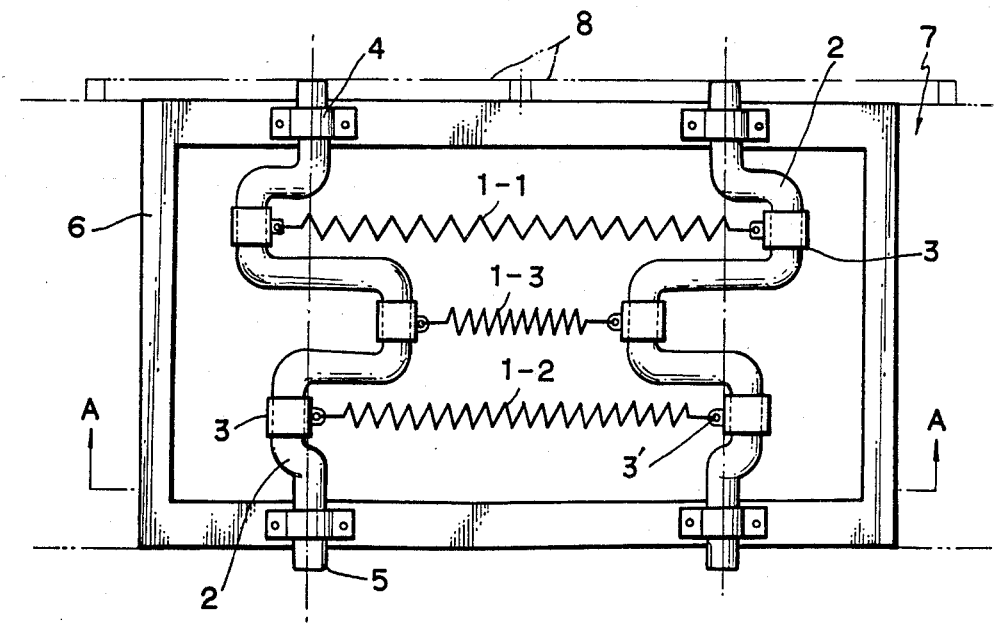
FIG. 2 is a top view of a preferred embodiment of a twin-crank type heat engine according to the present invention.
Figure 3:
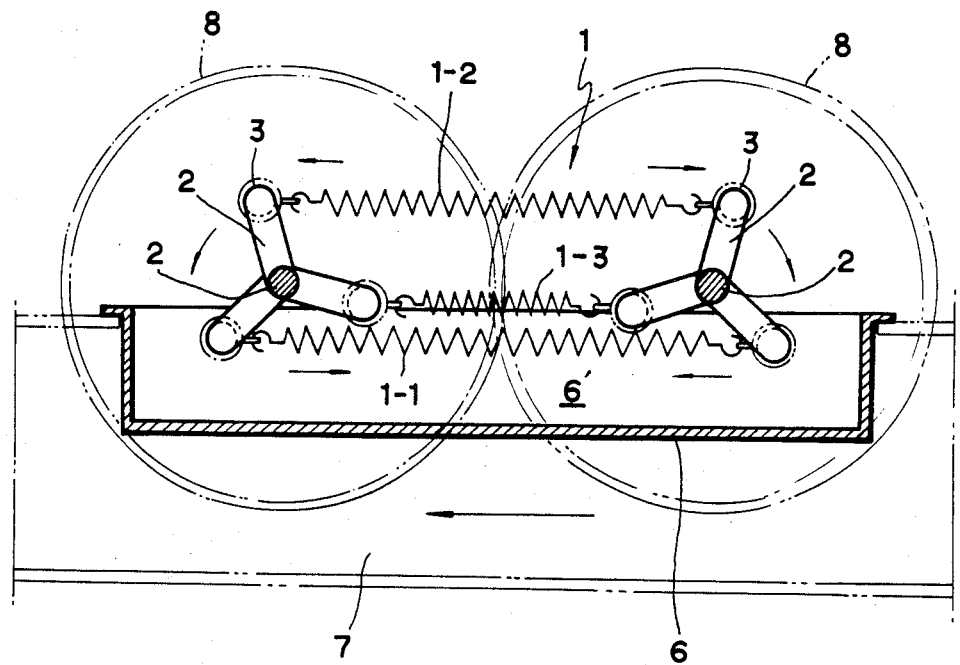
FIG. 3 is a sectional view taken along the line A—A in FIG. 2.

The power elements (1) shown in FIG. 1 are made of shape memory metal wire and formed into tightly wound coil having the characteristics, of being easily lengthened at atmospheric temperature by using a weak force tautly shrunk in a hot environment. Two crank shafts (2) are mounted in parallel with each other on the upper end of a hot water vessel (6). Power elements are installed on the sliding bearings (3) by means of hooking in the holes (3') on the bearings.

As crank shafts (2) begin to rotate, each power element reciprocates in a vertical motion in the vessel and rotates the crank shafts (2) by its lengthening and shrinking actions.

The vessel (6) is installed in the hot water passage (7) to absorb the exhausted heat.

The reference numeral 4 designates housing bearings, 5 the keys adapted to lock pulleys, gears or couplings on said crank shafts (2), and 8 a group of gears or links to rotate both shafts simultaneously. Now, operations of the engine of present invention will be described. The heat of hot water passing through the hot water passage is conducted into the water in the vessel. As the water in the vessel is heated, the power element (1-1) submerged in the hot water (6') exerts the thermal tensile force and rotates the crank shafts by pulling them. This rotating motion lifts the power element (1-1) out of the hot water and simultaneously puts the power element (1-2) into the hot water (6'). Thus, the power element (1-1) reduces its thermal tensile force by discharging heat thereof, and simultaneously, the power element (1-2) exerts the thermal tensile force and thus rotates the crank shaft by pulling them. The power element (1-3) also sequentially performs the same operation as mentioned above. Their successive repeated motions keep the shafts (2) rotating continuously.

The engine of present invention is operable by utilizing a part of hot water or air from the boilers or other facilities, in order to generate electric power and driving power of fans, gears and pumps for the facilities without external electrical power supply. This will provide a useful power source for industrial facilities.

What is claimed is:
1. A twin-crank type engine comprising: two crank shafts arranged symetrically with each other and partially submerged in a hot water vessel, power elements tightly coiled with shape memory metal wire and mounted between said crank shafts by means of sliding members, said power elements being able to perform a vertically reciprocating motion in parallel with the surface of the hot water in the vessel, and a mechanism for simultaneously rotating said crank shafts in the vessel.

* * * * *